(12) United States Patent
Sano et al.

(10) Patent No.: US 10,768,097 B2
(45) Date of Patent: Sep. 8, 2020

(54) ANALYZER, IMAGE CAPTURING APPARATUS THAT ACQUIRES COLOR INFORMATION, ANALYZING METHOD, AND STORAGE MEDIUM

(71) Applicant: CANON KABUSHIKI KAISHA, Tokyo (JP)

(72) Inventors: Daisuke Sano, Moka (JP); Tsubasa Nakamura, Saitama (JP); Hironobu Koga, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 15/916,758

(22) Filed: Mar. 9, 2018

(65) Prior Publication Data

US 2018/0266941 A1 Sep. 20, 2018

(30) Foreign Application Priority Data

Mar. 15, 2017 (JP) .................. 2017-050617

(51) Int. Cl.
*G01N 21/27* (2006.01)
*G01J 3/50* (2006.01)
(Continued)

(52) U.S. Cl.
CPC ............... *G01N 21/27* (2013.01); *G01J 3/50* (2013.01); *G01N 21/274* (2013.01); *G01N 21/33* (2013.01);
(Continued)

(58) Field of Classification Search
CPC ........ G01N 21/33; G01N 21/35; G01N 21/27; G01N 2201/129; G01N 21/274;
(Continued)

(56) References Cited

U.S. PATENT DOCUMENTS

| 2007/0192035 A1* | 8/2007 | Schweitzer | ......... G06F 16/2462 |
| | | | 702/19 |
| 2008/0278592 A1* | 11/2008 | Kuno | ..................... H04N 5/332 |
| | | | 348/222.1 |

(Continued)

FOREIGN PATENT DOCUMENTS

| JP | 5056297 B2 | 10/2012 |
| JP | 5361862 B2 | 12/2013 |

(Continued)

*Primary Examiner* — Michael P LaPage
(74) *Attorney, Agent, or Firm* — Rossi, Kimms & McDowell LLP (57) ABSTRACT

An analyzer includes an acquirer configured to acquire color information on visible light and at least one of ultraviolet light and infrared light from image data, a memory configured to store reference data on the color information, and a determiner configured to determine characteristic data of an object in the image data based on the color information, the reference data, and an image capturing condition information. The image capturing condition information contains information on a spectral characteristic of illumination light in image capturing, and a spectral sensitivity curve of an image sensor and information on a spectral transmittance of an image capturing optical system.

16 Claims, 8 Drawing Sheets (51) Int. Cl.
*G01N 21/35* (2014.01)
*G01N 21/33* (2006.01)
*G06T 7/90* (2017.01)

(52) U.S. Cl.
CPC ............... *G01N 21/35* (2013.01); *G06T 7/90* (2017.01); *G01N 2201/129* (2013.01)

(58) Field of Classification Search
CPC .... G01J 3/50; G01J 3/2823; G01J 2003/2826; G01J 3/524; G06T 7/90
See application file for complete search history.

(56) References Cited

U.S. PATENT DOCUMENTS

| | | | | | |
|---|---|---|---|---|---|
| 2009/0219614 | A1* | 9/2009 | Ryu | ............... | G02B 21/06 359/385 |
| 2009/0326383 | A1* | 12/2009 | Barnes | ............... | A61B 5/0059 600/476 |
| 2011/0013197 | A1* | 1/2011 | Schwarz | ............... | G01N 21/898 356/601 |
| 2011/0199097 | A1* | 8/2011 | Hartsough | ............... | A61B 5/05 324/629 |
| 2011/0237446 | A1* | 9/2011 | Treado | ............... | G06K 9/00147 506/8 |
| 2012/0007289 | A1* | 1/2012 | O'Connell | ............... | B29C 49/04 264/406 |
| 2013/0201342 | A1* | 8/2013 | Skaff | ............... | H04N 5/33 348/164 |
| 2014/0136132 | A1* | 5/2014 | Maekawa | ............... | G01R 21/006 702/63 |
| 2016/0069743 | A1* | 3/2016 | McQuilkin | ............... | G01J 3/2803 356/416 |
| 2019/0320126 | A1* | 10/2019 | Akashi | ............... | H04N 9/07 |

FOREIGN PATENT DOCUMENTS

| | | | |
|---|---|---|---|
| JP | 5668157 | B1 | 2/2015 |
| JP | 5930185 | B2 | 6/2016 |
| JP | 2017003495 | A | 1/2017 |
| JP | 2017035055 | A | 2/2017 |
| WO | WO-2016143139 | A1 * | 9/2016 ............... H04N 9/07 |

* cited by examiner

ANALYZER, IMAGE CAPTURING APPARATUS THAT ACQUIRES COLOR INFORMATION, ANALYZING METHOD, AND STORAGE MEDIUM

BACKGROUND OF THE INVENTION

Field of the Invention

The present invention relates to an analyzer that analyzes a captured image.

Description of the Related Art

A conventional component analyzing technology acquires spectral information of an object by using an image capturing apparatus, such as a hyper spectral camera, and extracts material information by utilizing the spectral information. Japanese Patent No. ("JP") 5,668,157 discloses a method for searching for a target based on a correlation between hyper spectral data and teacher data. The method disclosed in JP 5,668,157 converts the teacher data into a spectral reflection intensity on a flying object and corrects the teacher data by before verifying the acquired spectral information onto the teacher data. Thereby, the teacher data can be acquired based on environment light and a spectral sensitivity of an image sensor, and the robust target search is available for the environment light spectrum and spectral sensitivity of the image sensor on the flying object.

However, the method disclosed in JP 5,668,157 has difficulties in acquiring reflected light from an object, and the spectral information and teacher data information change according to an image capturing condition, such as a characteristic of the image capturing apparatus and image capturing environment. As a result, the component analysis result changes according to the image capturing condition.

SUMMARY OF THE INVENTION

The present invention provides an analyzer, an image capturing apparatus, an analyzing method, and a storage medium, which can accurately determine characteristic data of an object in image data, irrespective of an image capturing condition.

An analyzer according to one aspect of the present invention includes an acquirer configured to acquire color information on visible light and at least one of ultraviolet light and infrared light from image data, a memory configured to store reference data on the color information, and a determiner configured to determine characteristic data of an object contained in the image data based on the color information, the reference data, and an image capturing condition information. The image capturing condition information contains information on a spectral characteristic of illumination light in image capturing, and a spectral sensitivity curve of an image sensor and information on a spectral transmittance of an image capturing optical system.

An image capturing apparatus according to another aspect of the present invention includes an image capturer including an image capturing optical system and an image sensor, configured to capture an image and to output image data, an acquirer configured to acquire color information on visible light and at least one of ultraviolet light and infrared light from image data, a memory configured to store reference data on the color information, and a determiner configured to determine characteristic data of an object contained in the image data based on the color information, the reference data, and an image capturing condition information. The image capturing condition information contains information on a spectral characteristic of illumination light in image capturing, and a spectral sensitivity curve of an image sensor and information on a spectral transmittance of an image capturing optical system.

An analyzing method according to another aspect of the present invention includes the steps of acquiring color information on visible light and at least one of ultraviolet light and infrared light from image data, storing reference data on the color information, and determining characteristic data of an object contained in the image data based on the color information, the reference data, and an image capturing condition information. The image capturing condition information contains information on a spectral characteristic of illumination light in image capturing, and a spectral sensitivity curve of an image sensor and information on a spectral transmittance of an image capturing optical system.

A storage medium according to another aspect of the present invention stores a program that enables a computer to execute the above analyzing method.

Further features of the present invention will become apparent from the following description of exemplary embodiments with reference to the attached drawings.

BRIEF DESCRIPTION OF THE DRAWINGS

FIG. is a conceptual diagram of this embodiment.

DESCRIPTION OF THE EMBODIMENTS

Referring now the accompanying drawings, a description will be given of an embodiment according to the present invention.

Figure 1:
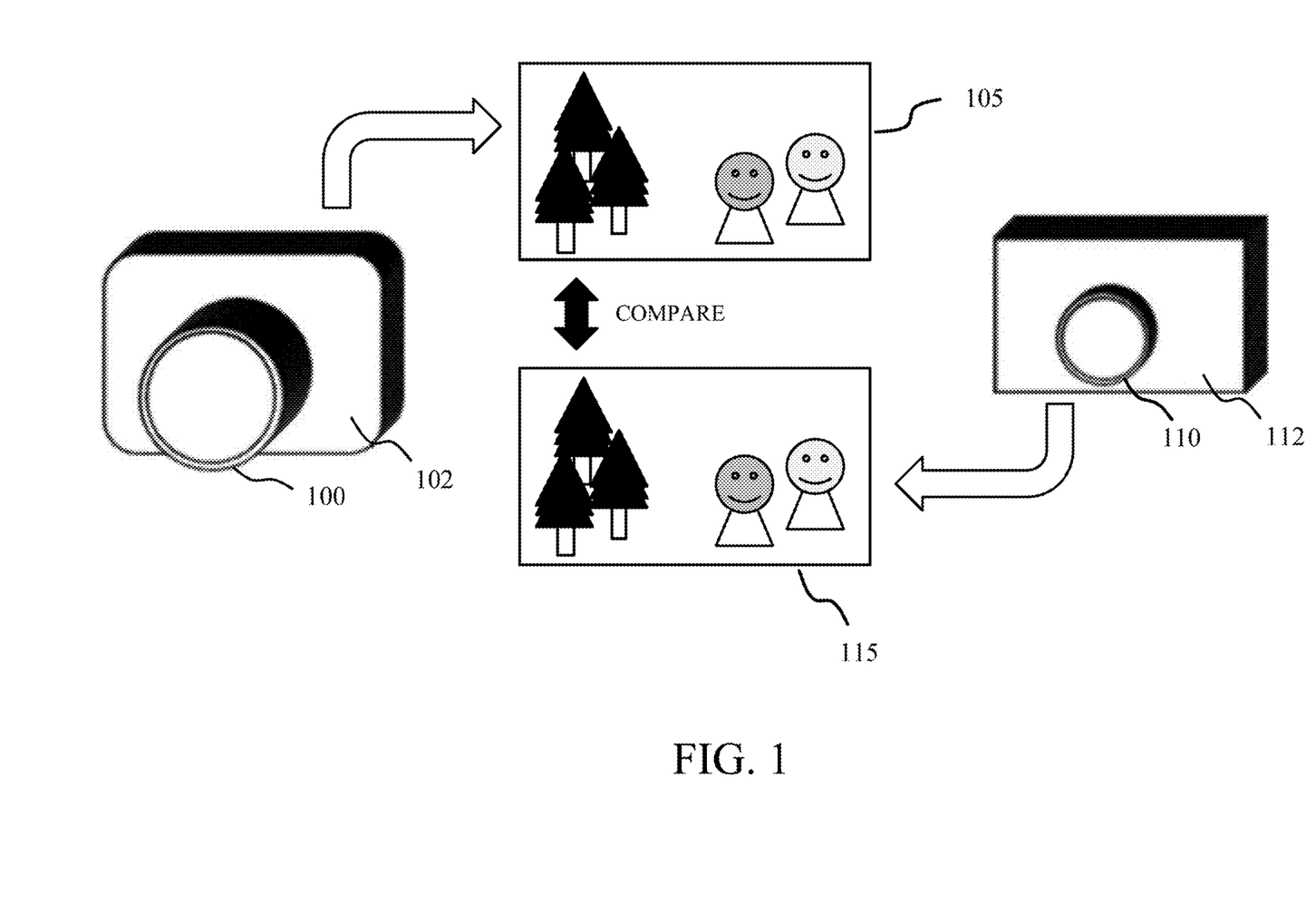
Figure 2:
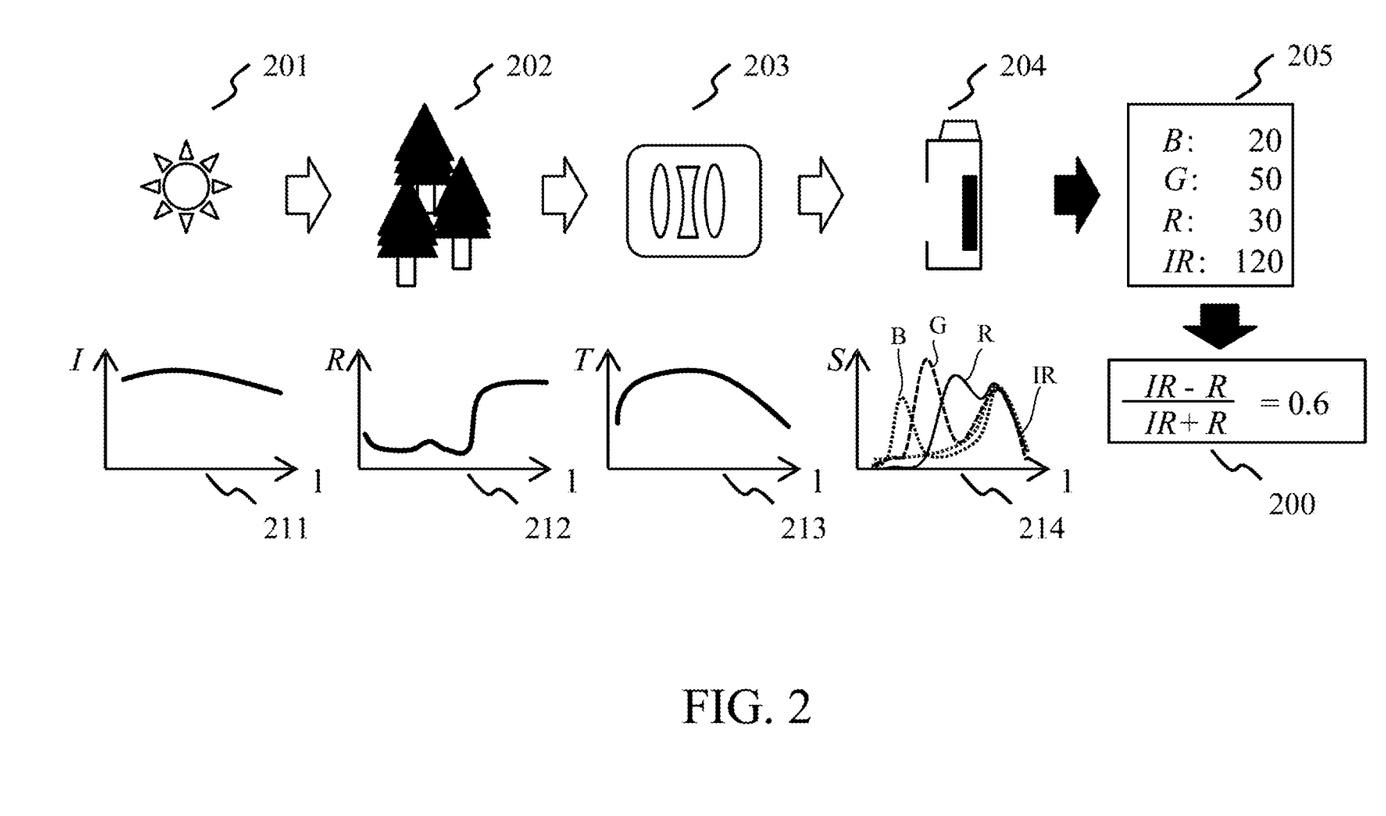
FIG. 2 is an explanatory view of a problem to be solved by this embodiment.
Figure 3:
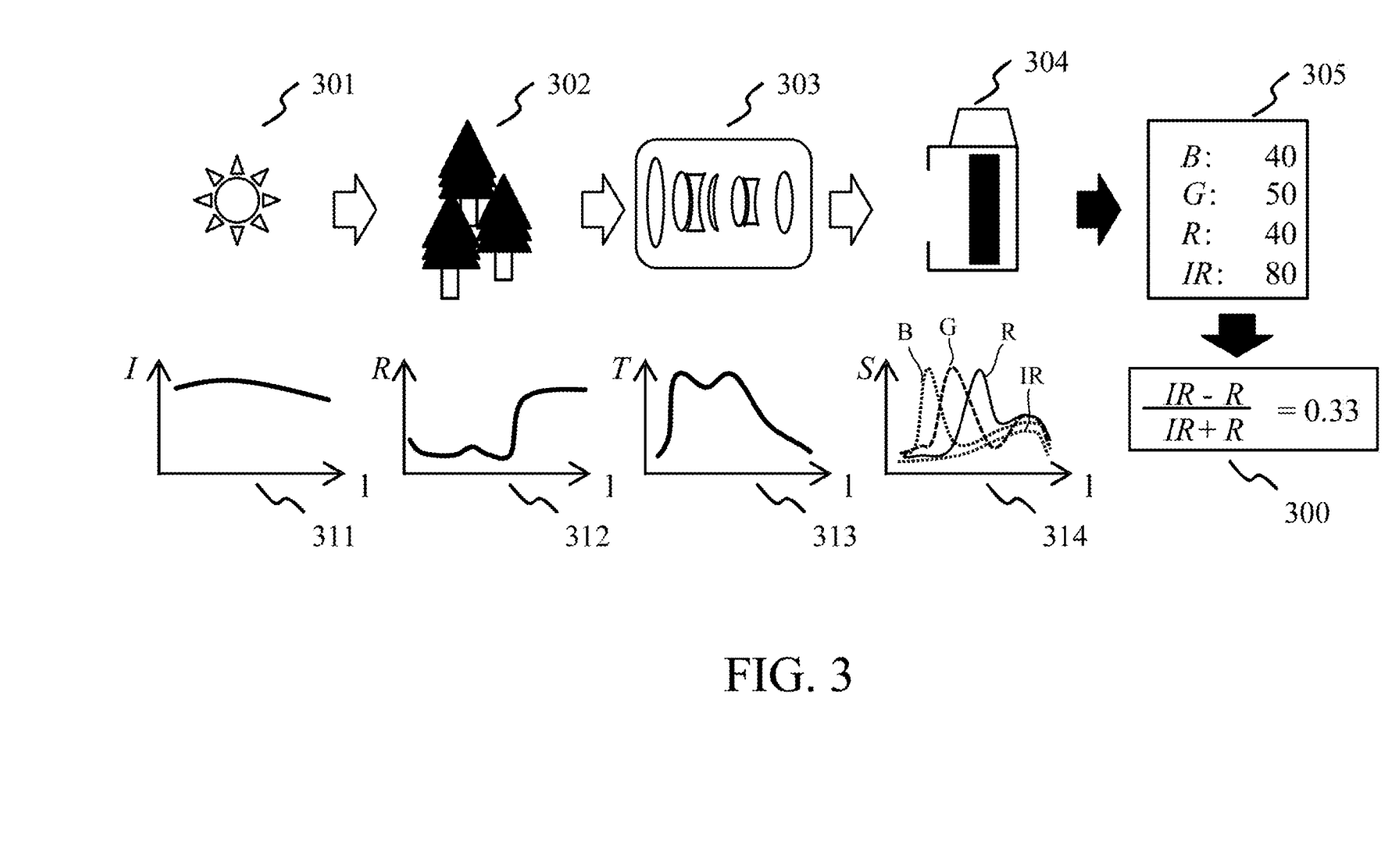
FIG. 3 is an explanatory view of a problem to be solved by this embodiment.

Referring now to FIGS. 1 to 3, a description will be given of a basic concept of this embodiment. FIG. 1 is a conceptual diagram of this embodiment. FIGS. 2 and 3 are explanatory views of a problem to be solved by this embodiment.

In FIG. 1, reference numerals 100 and 110 denote image capturing lenses (image capturing optical systems), and reference numerals 102 and 112 denote image capturing apparatuses. Reference numeral 105 denotes characteristic information (characteristic data) on a component of an object contained in a captured image (image data) acquired by the image capturing apparatus 102. Reference numeral 115 denotes characteristic information (characteristic data) on the component of the object contained in the captured image (image data) acquired by the image capturing apparatus 112. The image capturing lenses 100 and 110 are optical systems different from each other. The image capturing apparatuses 102 and 112 are also image capturing apparatuses different from each other. Characteristically, in this embodiment, the characteristic information 105 and the characteristic information 115 can be compared with or related to each other. In the conventional configuration, where the image capturing lenses 100 and 110 are different from each other or the image capturing apparatuses 102 and 112 are different from each other, the characteristic information 105 and the characteristic information 115 are not related to each other and cannot be compared with each other.

FIGS. 2 and 3 illustrate an acquisition of the color information and a conversion of a component of an object into a characteristic value (characteristic data) when the different image capturing lenses or apparatuses are used. In FIGS. 2 and 3, reference numerals 201 and 301 denote illumination lights, reference numerals 202 and 302 are objects, reference numerals 203 and 303 are image capturing lenses (image capturing optical systems), and reference numerals 204 and 304 are image capturing apparatuses.

Reference numeral 211 denotes a spectral distribution of the illumination light 201, reference numeral 212 denotes a spectral reflectance of the object 202, reference numeral 213 denotes a spectral transmittance of the image capturing lens 203, and reference numeral 214 denotes a spectral sensitivity curve of the image capturing apparatus 204. In the spectral distribution of the illumination light 211, the spectral reflectance 212, the spectral transmittance 213, and the spectral sensitivity curve 214, an abscissa axis is a wavelength λ and an ordinate axis is a light intensity I, a reflectance R, a transmittance T, and a sensitivity S, respectively. Similarly, reference numeral 311 denotes a spectral distribution of the illumination light 301, reference numeral 312 denotes a spectral reflectance of the object 302, reference numeral 313 denotes a spectral transmittance of the image capturing lens 303, and reference numeral 314 denotes a spectral sensitivity curve of the image capturing apparatus 304.

Reference numeral 205 denotes color information on image data output from the image capturing apparatus 204, and reference numeral 200 denotes a characteristic value (characteristic data) acquired by analyzing the color information 205. Similarly, reference numeral 305 denotes color information on image data output from the image capturing apparatus 304, and reference numeral 300 denotes a characteristic value (characteristic data) acquired by analyzing the color information 305. The image capturing apparatuses 204 and 304 can acquire color information of the infrared light (IR) in addition to the color information of the visible light of three colors of red (R), green (G), and blue (B). Each of the spectral sensitivity curves 214 and 314 illustrates a solid line, a broken line, a dotted line, and a double broken line of the spectral sensitivity curves for R, G, B and IR. This embodiment outputs, as the characteristic values 200 and 300, a value obtained by dividing a difference IR and R by a sum of IR and R. This embodiment is not limited to this example. Another type of characteristic data may be used to indicate the characteristic of the object and the characteristic value. This embodiment can use color information on ultraviolet light instead of infrared light or both ultraviolet light and infrared light.

In FIGS. 2 and 3, the illumination lights 201 and 301 are equal to each other, and the objects 202 and 302 are equal to each other. The (characteristics of the) image capturing lenses 203 and 303 are different from each other, and the (characteristics of the) image capturing apparatuses 204 and 304 are different from each other. Thus, the spectral transmittances 213 and 313 are different from each other, and the spectral sensitivity curves 214 and 314 are different from each other. As a result, while the illumination lights 201 and 301 are equal to each other and the objects 202 and 302 are equal to each other, the color information 205 on the image data acquired with the image capturing apparatus 204 and the color information 305 on the image data acquired with the image capturing apparatus 304 are different from each other. Hence, the characteristic values 200 and 300 are different from each other. Two-dimensional image data enables the characteristic values 200 and 300 to be analyzed for one pixel in the image sensor (image pickup element) in the image capturing apparatus. Thus, the two-dimensional image data obtained with the different image capturing lenses and the different image capturing apparatuses provide images having different characteristic values.

Accordingly, in order to solve this problem, this embodiment corrects a factor of changing a characteristic value (characteristic data) (or reduces a factor changing with a characteristic of an image capturing apparatus etc.). In this embodiment, the image capturing apparatuses 204 and 304 can acquire at least one of ultraviolet light and infrared light, and visible light that contains wavelength information of at least three or more colors. Each of the ultraviolet light and the infrared light has a wavelength suitable to draw (or determine) the characteristic values 200 and 300 in comparison with the visible light. The wavelengths of the ultraviolet light and the infrared light are wavelengths with a fingerprint spectrum that represents a characteristic absorption of a molecule in the objects 202 and 302 and are effective wavelengths in identifying the materials of the objects 202 and 302. For example, the ultraviolet light is suitably used to identify the material of an inorganic substance, and the infrared light (the near infrared light) is suitably used to identify the material of an organic substance. On the other hand, the visible light is useful for a person to recognize the object, and useful for a positional conformation between the image and the object.

In this embodiment, the color information 205 and the color information 305 are converted into characteristic values 200 and 300 (characteristic data), such as unique characteristics and numerical values relating to the object based on reference data, such as a verification with an experimentally obtained dictionary and a multivariance analysis equation. Thus, the material can be identified by determining the characteristic data based on the color information of the image data.

The experimentally obtained dictionary contains information on a characteristic amount extracted by a statistical method, in which the color information 205 of the object 202 is tagged with the material information. This characteristic amount has a mathematical branch, and serves to tag newly acquired color information 205 with the characteristic of the object 202. A method for drawing the characteristic of the object by using this dictionary contains a material discrimination caused by a main component analysis result, mechanical learning represented by the CNN (Convolutional Neural Network), etc. The characteristic value 200 drawn by these methods is a "characteristic or performance" of the object 202.

On the other hand, the multivariance analysis equation is a method for utilizing the characteristic equation used to analyze the numerical value of the obtained color information 205. A ratio between a difference between R and IR and a sum of R and IR in the characteristic value 200 is used as an index called a Normalized Difference Vegetation Index in the agriculture market. However, this embodiment is not limited to this example, and may use many indexes, such as the Normalized Difference Vegetation Index NDWI, and the Normalized Difference Soil Index NDSI, and another method that tags the component amount with the color information 205 for previous learning, and calculates a calibration curve function correlated with the component amount and the color information 205. The characteristic value 200 drawn by these methods is a "numerical value."

Thus, a shape of the characteristic value 200 differs according to a method for analyzing the color information 205, and the reference data, such as dictionary previously prepared for learning and a multivariance analysis equation, is necessary to draw the characteristic value 200. The reference data is influenced by the image capturing lens 203, the image capturing apparatus 204, and the illumination light 201 (image capturing environment).

Figure 4:
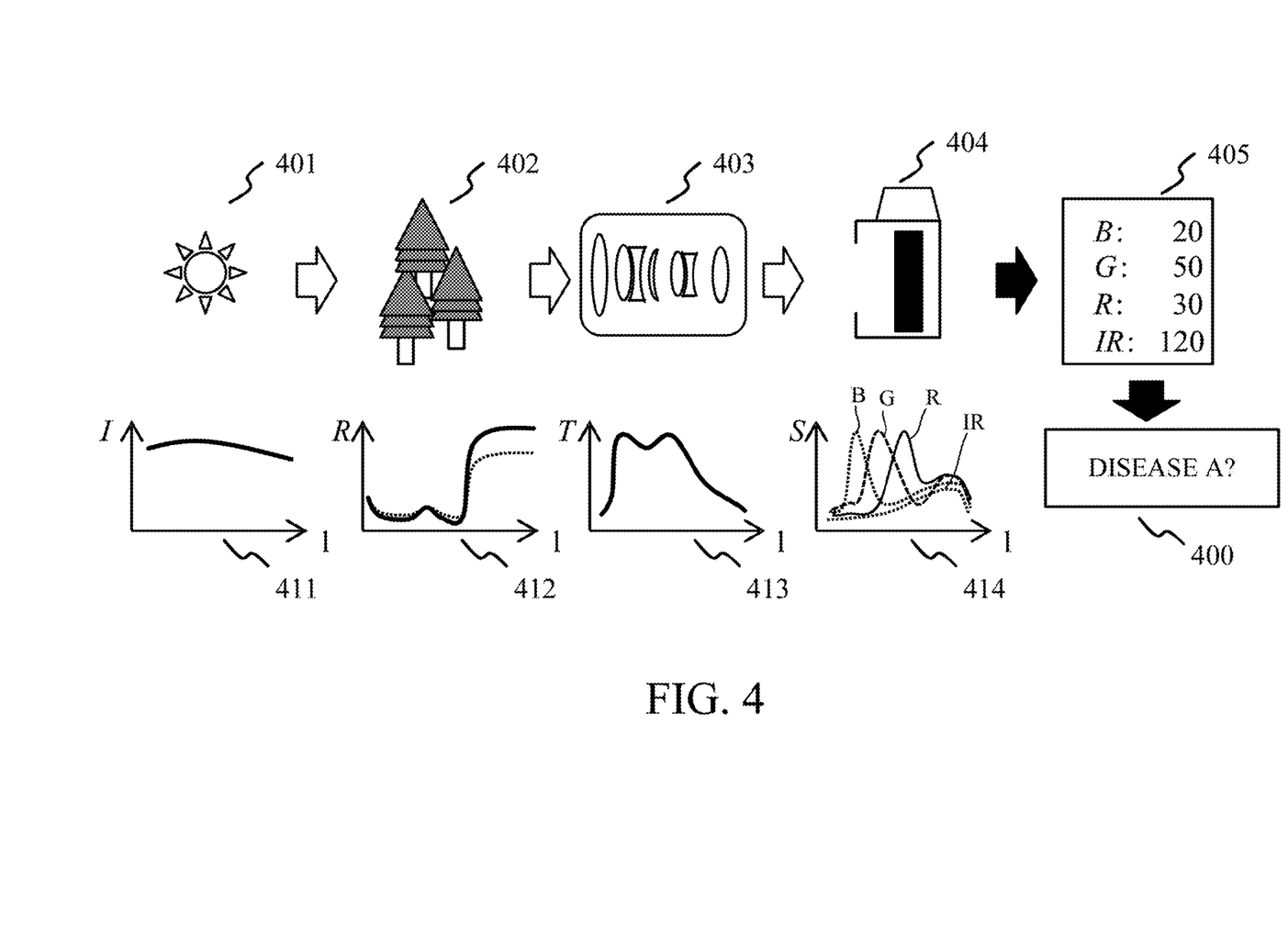
FIG. 4 is an explanatory view of an analyzing method according to this embodiment.

Referring now to FIGS. 2 to 4, a description will be given of this influence. FIG. 4 is an explanatory view of an analyzing method according to this embodiment. In FIG. 4, reference numeral 401 denotes an illumination light, reference numeral 402 denotes an object (or a tree as an object), reference numeral 403 denotes an image capturing lens (image capturing optical system), and reference numeral 404 denotes an image capturing apparatus. Reference numeral 411 denotes a spectral distribution of the illumination light 401, reference numeral 412 denotes a spectral reflectance of the object 402, reference numeral 413 denotes a spectral transmittance of the image capturing lens 403, and reference numeral 414 denotes a spectral sensitivity curve of the image capturing apparatus 404. Reference numeral 405 denotes color information of image data output from the image capturing apparatus 404, and reference numeral 400 denotes a characteristic value (characteristic data) acquired by analyzing the color information 405. A broken line in the spectral reflectance 412 corresponds to the spectral reflectance 312 of the object 302 in FIG. 3, and a solid line in the spectral reflectance 412 corresponds to the spectral reflectance of the object 402.

The objects 202 and 302 are equal objects. For example, where the dictionary is to be prepared by using the characteristic values 200 and 300 as the characteristics, the states of the object 202 and the object 302 and the color information 205 and the color information 305 are previously tagged with each other. For example, states of the objects 202 and 302 (trees) suffer from "disease A" (such as withered trees), the color information 205 and the color information 305 are tagged with the characteristics of the "disease A" and previously learned. However, the characteristic of the image capturer, such as the image capturing lens and the image capturing apparatus, and an image capturing environment such as illumination light are different, and thus the color information 205 and the color information 305 have different numerical values and provide dictionaries having different correlations with respect to the characteristic values 200 and 300. In other words, the objects 202 and 302 have the equal characteristics but different dictionaries.

The illumination light 401, the image capturing lens 403, and the image capturing apparatus 404 in FIG. 4 are the same as the illumination light 301, the image capturing lens 303, and the image capturing apparatus 304 in FIG. 3. When FIG. 3 is compared with FIG. 4, the object 402 is different from the object 302 and the spectral reflectance 412 is different from the spectral reflectance 312. As understood from FIGS. 2 and 4, the color information 405 and the color information 203 have equal values. When the color information 405 is analyzed with a dictionary prepared with a configuration in FIG. 2, the color information 205 and the color information 405 have the same information and thus the "disease A" is output as the characteristic value 400 (characteristic data). In reality, the objects 202 and 405 have different characteristics and the spectral reflectances 212 and 412 have different characteristics. This is because the image capturing lenses 203 and 403 and the image capturing apparatuses 204 and 404 and changes of the objects 202 and 402 change in opposite directions.

Thus, when the image capturers, such as such as the image capturing lens and the image capturing apparatus, have different characteristics, the reference data, such as the previously learned dictionary and the multivariance analysis equation, cannot be simply utilized. This is similarly applied where the image capturing environment changes, such as the illumination light. Prior art handles this problem by any one of the following methods (1) to (3): (1) A first method obtains a meaningless characteristic by blindly utilizing the reference data; (2) a second method uses the reference data by limiting a type of the image capturer, such as the image capturing lens and the image capturing apparatus; and (3) a third method prepares for a data set so that the reference data can be comprehensively applied. However, any of them have problems: inaccurate data, a narrow application range due to the limited type of the image capturer, and complex preparations of the dictionary and the multivariance analysis equation.

Accordingly, this embodiment draws a condition used to convert color information in accordance with the image capturing lenses 203 and 303 and the image capturing apparatus 204 and 304, and a condition used to convert the color information in accordance with the image capturing environment (illumination lights 201 and 301). The methods for obtaining these conditions contain a previous acquiring method utilizing a designed value, a measured value, etc., and a sequentially acquiring method that captures a reference plane and measures the luminance in image capturing. Of course, this embodiment is not limited to these methods, and may utilize another method as long as the condition of the image capturer, such as the image capturing lens and the image capturing apparatus, and the condition of the image capturing environment, such as the illumination light are available.

This embodiment converts or corrects the color information in the image data obtained from the image capturing apparatus, the reference data, such as the experimentally obtained dictionary and the multivariance analysis equation, or both with the above condition, and draws the characteristic data, such as the characteristic and the characteristic value. The condition used for this conversion (correction) contains, but is not limited to, the spectral distribution of the illumination light, the spectral transmittance, and the spectral sensitivity curve.

For example, when FIGS. 2 and 3 are compared with each other, the spectral distributions of the illumination lights 211 and 311 are equal to each other but the spectral transmittances 213 and 313 are different from each other and the spectral sensitivity curves 214 and 314 are different from each other. When FIG. 2 is set to a reference, the conditions of a coefficient 3/4 for R and a coefficient 3/2 for IR are drawn based on the spectral transmittance 213 and the spectral sensitivity curve 214. The characteristic value 300 is drawn based on this manner. For example, any one of the following methods (1) to (3) may be used but the present invention is not limited to these examples.

(1) Color information is corrected and a characteristic value is drawn by a multivariance analysis equation.

$R=40\times3/4=30$, $IR=80\times/2=120$ $(IR-R)/(IR+R)=0.6$ (2) A multivariance analysis equation is corrected and a characteristic value is drawn without correcting color information.

$R=40$, $IR=80$ $(IR\times3/2-R\times3/4)/(IR\times3/2+R\times3/4)=0.6$ (3) Both color information and multivariance analysis equation are corrected and a characteristic value is drawn.

$R=40\times3/4=30$, $IR=80$ $(IR\times3/2-R)/(IR\times3/2+R)=0.6$

When FIG. 2 is compared with FIG. 3, the spectral distributions of the illumination lights 211 and 311 are equal to each other and thus the spectral distribution of the illumination light is not used to calculate the characteristic value. Since this embodiment attempts to compensate a factor of a shift of the characteristic value, the condition having no shift may not be added to the calculation. On the other hand, even for this condition, correcting the spectral distribution of the illumination light 211 facilitates the comparison with the structure of FIG. 3 when the illumination condition in FIG. 2 changes. They can be selected according to the usage application. Although this example draws the numerical value as the characteristic value, drawing of the characteristic using the dictionary may similarly be utilized. This embodiment may prepare one reference dictionary or multivariance analysis equation (reference data) without depending on the image capturing lens, the image capturing apparatus, and the illumination light. The dictionary prepared for previous learning and the multivariance analysis equation can be statistically drawn and need corresponding labors. On the other hand, when using one condition to draw the dictionary and the multivariance analysis equation, this embodiment utilizes the result with the information of the image capturer and the environment information.

Next follows a detailed description of the condition for the color information to change. When the ultraviolet or the infrared light is selected in addition to the visible light, a range of the color information 205 may be twice as broad as that with the minimum wavelength. In this broadband wavelength, the spectral transmittance of the image capturing lens is likely to significantly change. A factor that significantly determines the transmittance of the image capturing lens is a material of a lens, the number of lenses, and a performance of the antireflection film provided on the lens surface. Among them, the characteristic of the antireflection film is one of factors that change in accordance with the wavelength. In general, the antireflection film reduces the reflectance by utilizing the interference of the optical thin film.

Figure 5:
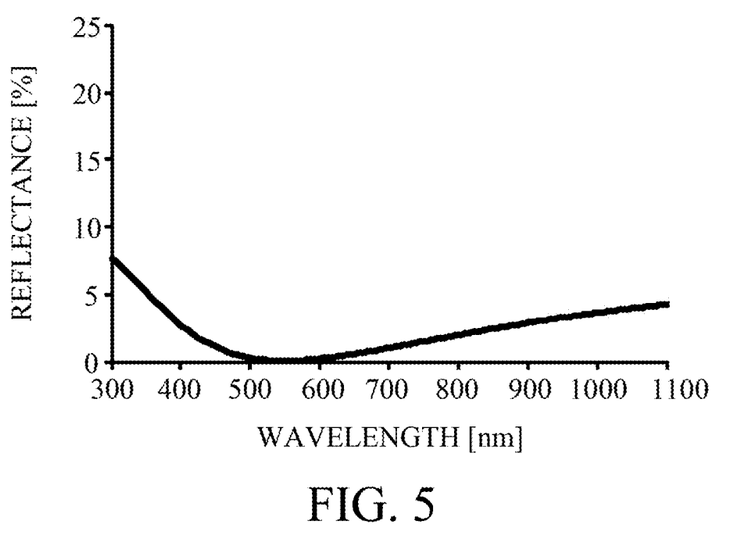
FIG. 5 is a reflectance characteristic of an antireflection film according to this embodiment.
Figure 6:
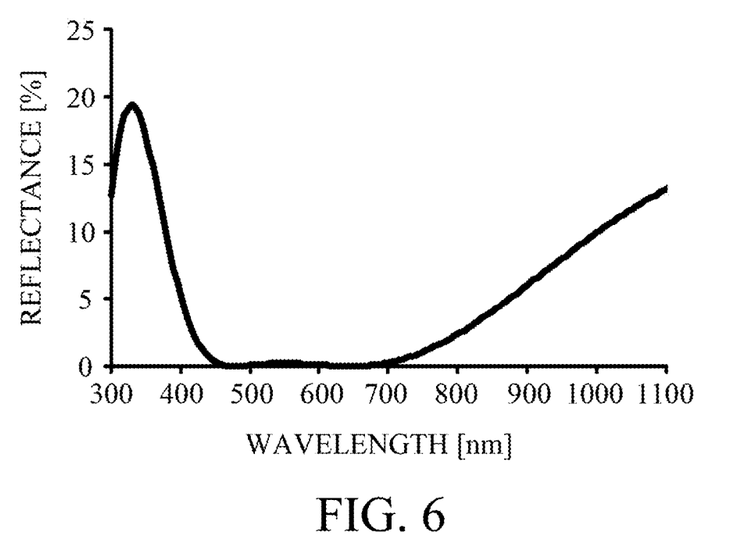
FIG. 6 is a reflectance characteristic of an antireflection film according to this embodiment.

Referring now to FIGS. 5 and 6, a description will be given of a characteristic of the antireflection film of the image capturing lens. FIGS. 5 and 6 illustrate an exemplary reflectance characteristic of an antireflection film, where an abscissa axis denotes a wavelength, and an ordinate axis denotes a reflectance. FIG. 5 illustrates an exemplary antireflection film with a single layer film made of a material having a high refractive index of a substrate, and Table 1 summarizes concrete characteristics. FIG. 6 illustrates an exemplary antireflection film with a three-layer film made of a material having a low refractive index of a substrate, and Table 2 summarizes concrete characteristics. In order to restrain the generally utilized reflectance of the visible light, the wavelength is set to 550 nm, and the physical film thickness is set so that the optical film thicknesses are λ/4 and λ/2. This film thickness is suitable under the optical thin film theory.

TABLE 1

|  | REFRACTIVE INDEX | PHYSICAL FILM THICKNESS [nm] | NOTES |
| --- | --- | --- | --- |
| INCIDENT MEDIUM | 1.00 |  |  |
| THIN FILM 1-1 | 1.38 | 99.6 | λ/4 |
| SUBSTRATE | 1.80 |  |  |

TABLE 2

|  | REFRACTIVE INDEX | PHYSICAL FILM THICKNESS [nm] | NOTES |
| --- | --- | --- | --- |
| INCIDENT MEDIUM | 1.00 |  |  |
| THIN FILM 2-1 | 1.38 | 99.6 | λ/4 |
| THIN FILM 2-2 | 2.13 | 129.1 | λ/2 |
| THIN FILM 2-3 | 1.63 | 84.4 | λ/4 |
| SUBSTRATE | 1.80 |  |  |

When FIG. 5 is compared with FIG. 6, it is understood that the reflectance can be reduced in the visible light having a visible range wavelength (400-700 nm). On the other hand, the reflectance increases in the ultraviolet light with a wavelength of 400 nm or shorter and in the infrared light with a wavelength of 700 nm or higher outside the visible range. The optical thin film reduces the reflectance through the interference, and cannot maintain the proper interference cannot in a wavelength range that is at least twice as long. Thus, when the ultraviolet light or the infrared light is utilized in addition to the visible light, the reflectance of the antireflection film increases with the wavelength band. A characteristic of a wavelength band having a high reflectance is sensitive to the physical film thickness of the thin film. Due to the manufacturing error and film unevenness, the reflectance characteristic is likely to fluctuate. Hence, in capturing an image with information on the ultraviolet light or the infrared light in addition to the visible light, the spectral transmittance changes according to the shape and manufacturing method of the image capturing lens. This is one factor that changes the color information.

The spectral sensitivity curve of the image capturing apparatus is the spectral sensitivity of the image sensor itself. The spectral sensitivity curve is determined in accordance with an on-chip color filter on the image sensor and a photoelectric conversion efficiency of the image sensor (photoelectric conversion element), such as a CMOS sensor. The specification of the image sensor is different according to the image capturing apparatus, and the sensitivity curve significantly changes. This is also one factor that changes the color information.

Figure 7:
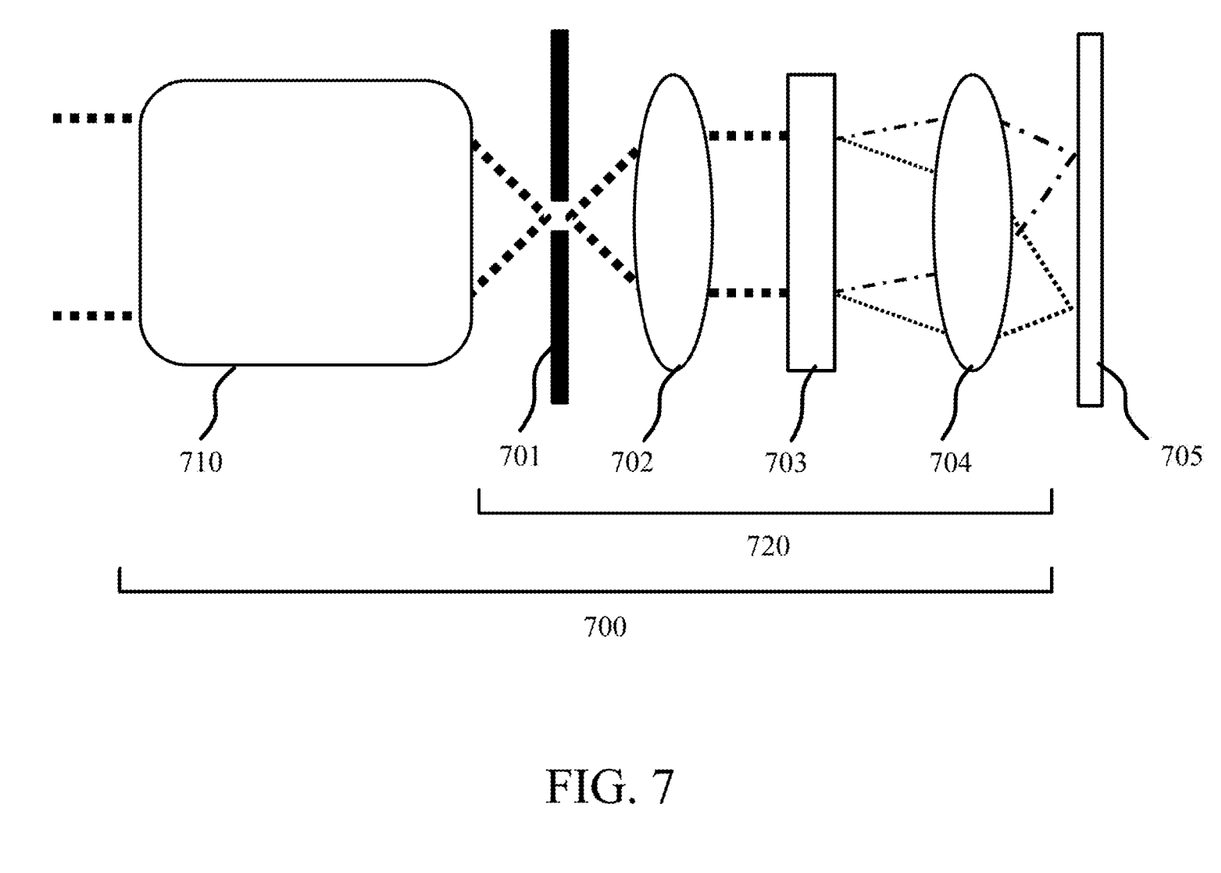
FIG. 7 is a sectional view of a spectral optical system according to this embodiment.

On the other hand, there is a condition that changes the spectral sensitivity curve irrespective of the on-chip color filter. FIG. 7 is a sectional view of a spectral optical system utilizing a diffraction grating. In FIG. 7, reference numeral 700 denotes an image capturing lens (image capturing optical system), reference numeral 710 denotes an imaging lens, and reference numeral 720 denotes a spectral lens. The spectral lens 720 includes, in order from the imaging lens 710, a slit 701, a collimator lens 702, a diffraction grating 703, and a condenser lens 704. Reference numeral 705 denotes an image sensor or image pickup element. In FIG. 7, a broken line and an alternate long and short dash line represent abbreviated optical paths.

The slit 701 is arranged on an image plane imaged by the imaging lens 710. The slit 701 cuts only part of the image plane, and serves as an entrance that introduces light to the spectral lens (optical system) 720. The light that has passed the slit 701 is collimated by the collimator lens 702, and enters the diffraction grating 703. A diffraction angle changes according to the wavelength in the diffraction grating 703, and the condenser lens 704 condenses the light on the image sensor 705. The light diffracted by the diffraction grating 703 are illustrated by the broken line and the alternate long and short dash line. The imaging lens 710 may use a general image capturing lens, such as the image capturing lenses 203 and 303. When the image capturing optical system 700 has this spectral characteristic, the reduced transmittance of the imaging lens 710 decreases and the spectral efficiency of the spectral optical system 720 correspond to the spectral sensitivity curve itself. In particular, since the diffraction efficiency in the diffraction grating 703 changes according to the wavelength, the characteristic of the diffraction grating 703 can be one factor that changes the color information.

A color in the image capturing lens may change due to a factor other than a simple transmittance. The image capturing lens may have a phenomenon called vignetting, which causes a surrounding light quantity to drop. In general, it follows the cosine fourth law and as the grazing incidence proceeds, the light quantity drops in accordance with the cosine fourth law of the angle of view based on an apparent area viewed from the entrance pupil and a solid angle relationship. This is mainly because of the reduced area of the light flux that transmits the image capturing lens but the color also changes because the light transmits in the periphery of the image capturing lens. The periphery of the image capturing lens often has an oblique shape relative to the light incident direction, and the reflectance change of the antireflection film is significant relative to the wavelength. In addition, off-axis optical paths are different depending on the wavelength and the different optical paths cause the color information on the image sensor to change. This characteristic is one factor that changes the color information.

Figure 8:
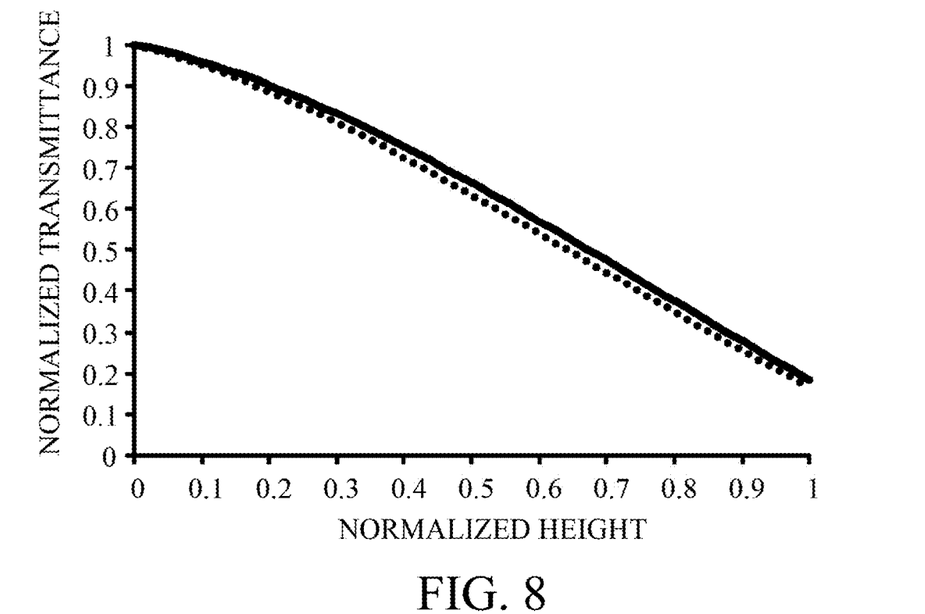
FIG. 8 is a transmittance characteristic affected by vignetting according to this embodiment.
Figure 9:
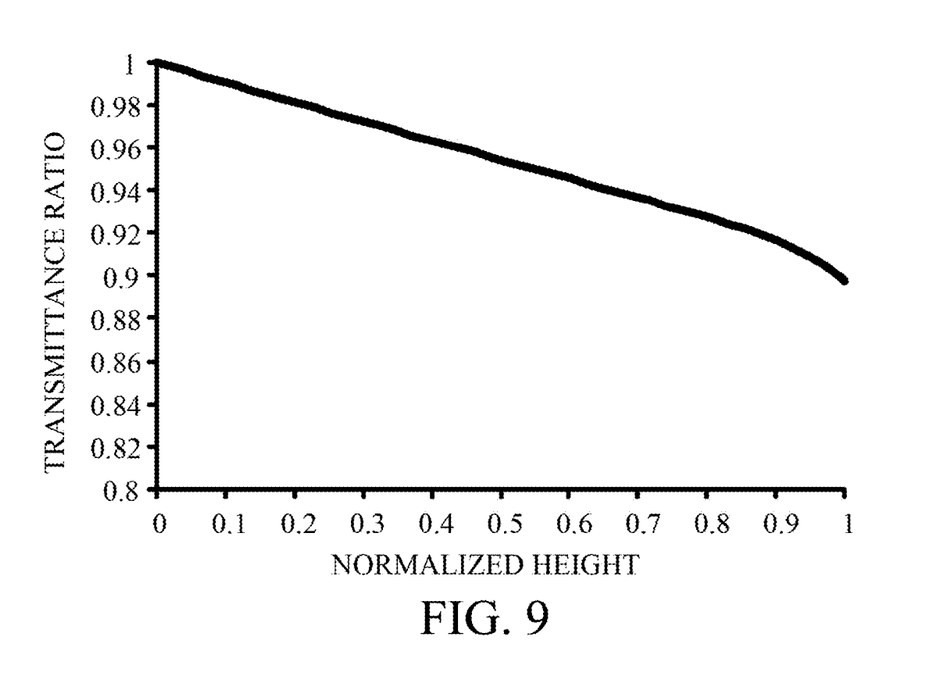
FIG. 9 is a transmittance ratio characteristic affected by the vignetting according to this embodiment.

Referring now to FIGS. 8 and 9, a description will be given of a color change caused by vignetting. FIG. 8 illustrates a transmittance characteristic caused by the vignetting. FIG. 9 is a transmittance ratio characteristic caused by the vignetting. The image capturing optical system (image capturing lens) has an angle of view of about 50°. FIG. 8 is a graph in which the abscissa axis is a normalized height from the optical axis in the image capturing optical system, and the ordinate axis is a normalized transmittance when the transmittance of the optical axis is set to 1. Herein, a broken line denotes the transmittance characteristic for the wavelength in the visible range, and a solid line denotes the transmittance characteristic for the wavelength that is twice as long as the wavelength of the broken line. A variation amount of the transmittance changes for the normalized height.

FIG. 9 is a graph in which the abscissa axis denotes a normalized height similar to FIG. 8, and the ordinate axis denotes a transmittance ratio between the solid line and the broken line in FIG. 8. It is understood that when the normalized height is 1, the solid line wavelength and the broken line wavelength exhibit drop amounts different by about 10%. This phenomenon is one factor that changes the color information according to the image capturing lens. Thus, in acquiring a two-dimensional image having an angle of view as in characteristic information 105 in FIG. 1, the color information changes according to a location due to the influence of the image capturing optical system.

As discussed, it is understood that the condition in which the color information is converted by the image captures, such as the image capturing lens and the image capturing apparatus, is independent of the object and the illumination. Moreover, it is understood that a dynamic range significantly changes according to the acquired wavelength based on this condition. In other words, in image capturing under a condition in which the object is a simple white plate or the spectral reflectance is constant and the spectral distribution of the illumination light is constant, the acquired values scatter for each wavelength of the color information. This is automatically determined once the image capturing lens and the image capturing apparatus are determined. Accordingly, this embodiment executes different noise reduction processing for wavelength information when the determined sensitivity is different according to the image capturing lens and the image capturing apparatus. When the sensitivity is half the wavelength or smaller, this configuration is particularly effective. Stronger noise reduction processing may be performed for the wavelength band in which the sensitivity is low.

One factor that changes the color information is a state of the illumination light used to illuminate the object. For example, a light source like the sun is determined by the plunk radiation from the heat source, and thus its characteristic can be uniquely calculated. On the other hand, a state of light reaching the object changes due to the atmospheric state, weather, and sun position, while the object is illuminated. For example, the tint of the object changes between the cloudy day and the fine day due to the changing illumination condition (image capturing environment). The image capturing apparatus according to this embodiment may include a unit for evaluating the influence of the illumination on the color information.

For example, the image capturing lens or the image capturing apparatus may include a luminance meter, and the illumination condition may be directly acquired. Direct acquiring the illumination condition can facilitate an acquisition of the illumination condition. Another method installs a reference plate, such as a white plate, near the object. The reference plane needs a known spectral reflectance, and thereby the illumination condition can be estimated. Still another method utilizes external information obtained by measuring the atmospheric state through satellite information, weather information, etc., and estimates the illumination. However, this embodiment is not limited to these examples, and can select an arbitrary technology suitable for the purpose. The purpose of this embodiment is to make the characteristic information 105 and the characteristic information 115 comparable with each other. For this purpose, the illumination may not be accurately obtained, such as always using the same indoor illumination, or using the sun that is a very strong outdoor light source and is dominant. Strictly speaking, some fluctuations may occur but the shape of the spectral distribution of the illumination light does not significantly change. In such a case where the color information is not significantly affected, the condition that converts the color information depending on the illumination is negligible.

While this embodiment describes changes of the spectral distribution of the illumination light, the color information may be converted until the object light reaches the image capturing lens. Accordingly, the image capturing apparatus according to this embodiment can measure the object distance (distance to the object), and may convert the color information or the reference data, such as a dictionary and a multivariance analysis equation, by utilizing the measured distance information. The reflected light from the object can be more accurately estimated based on scattering in a space between the object and the image capturing lens etc. For example, if there is an element that converts the color information in a propagation space, such as dust and underwater, an attenuation amount can be calculated in accordance with the Lambert-Beer law. A distance measuring method may contain, but is not be limited to, a triangulation method utilizing two viewpoints, a TOF method utilizing the illuminations, a light severing method, etc.

This embodiment converts the color information with a value different from a converted value of the color information, and forms a viewable image (or an image to be viewed). This embodiment may additionally perform a necessary conversion that enables a person to recognize a white object generally referred to as white balance to be white. The viewable image is suitable for the observation by the person, and useful for a person to recognize the object. A conversion of the color information for the person's recognition and a conversion of the color information used to draw the characteristic value are different from each other. The former enables the person to recognize the image and to provide a subjective conversion suitable for the person's relative visibility and memorized color. The latter provides a physically correct conversion based on the dictionary and the multivariance analysis equation.

The image capturing apparatus in this embodiment draws the characteristic value, but another apparatus may draw the characteristic value as long as the characteristic value can be compared. For example, an analysis system (analyzer) that runs on the external device may draw the characteristic value based on color information of the image data acquired from the image capturing apparatus. In this case, it is necessary to introduce into the analysis system the illumination related condition in which the color information is converted, and the condition related to an image capturer, such as an image capturing lens and an image capturing apparatus. The introducing method contains a method for providing it to the color information, a method for utilizing the Internet and a database, such as LUT, etc. The color information or reference data (dictionary or multivariance analysis equation) are converted based on the information, and the characteristic value is properly drawn.

Figure 10:
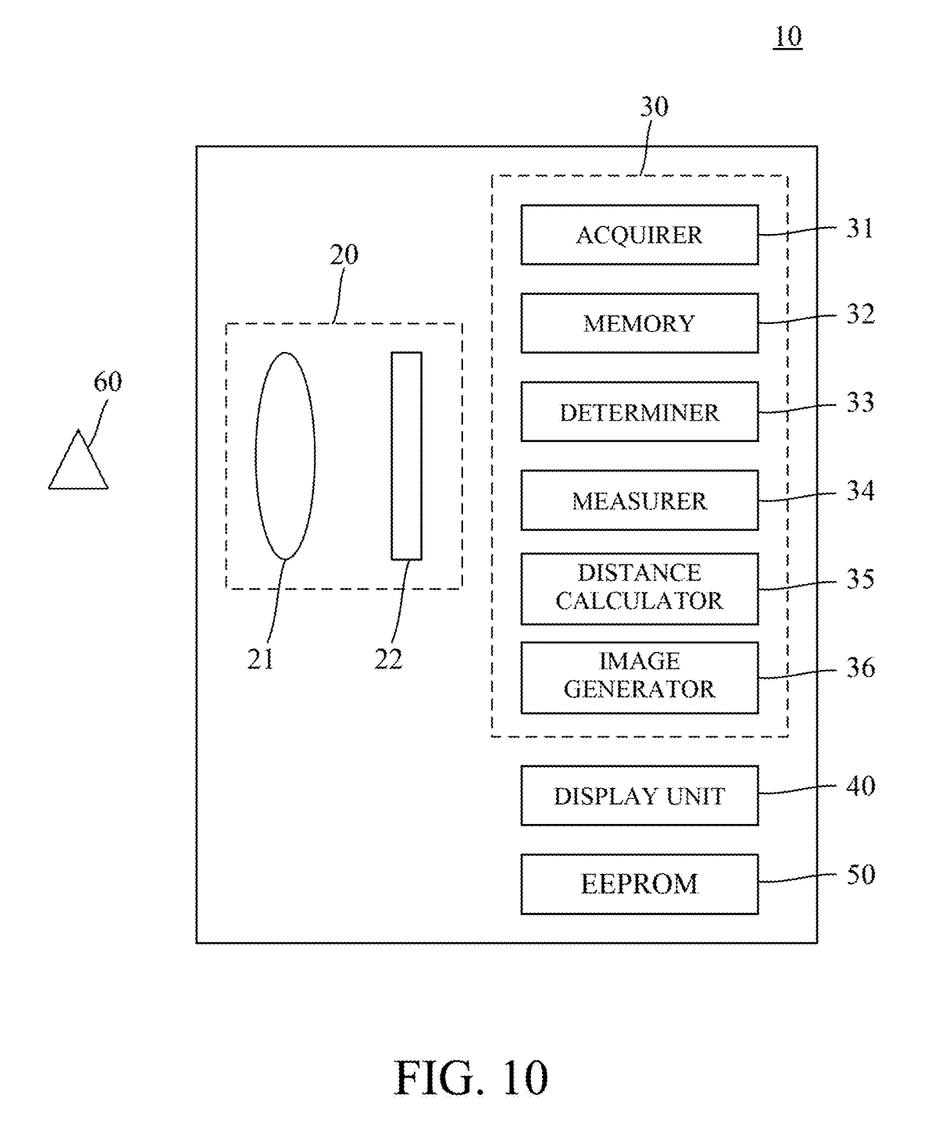
FIG. 10 is a block diagram of an image capturing apparatus according to this embodiment.

Referring now to FIG. 10, a description will be given of a configuration of an image capturing apparatus according to this embodiment. FIG. 10 is a block diagram of an image capturing apparatus 10. The image capturing apparatus 10 includes an image capturer 20, an analysis device 30, a display unit 40, and an EEPROM 50 (removable memory). The image capturer 20 includes an image capturing optical system 21 (image capturing lens), and an image sensor 22 (image pickup element). The image sensor 22 includes a CCD sensor, etc., photoelectrically converts an optical image of an object 60 formed via the image capturing optical system 21, and outputs the image data. In this embodiment, the image capturing optical system 21 is integrated with the image capturing apparatus body having the image sensor 22, but the present invention is not limited to this embodiment. The image capturing optical system 21 may be attached to and detached from the image capturing apparatus body.

The analyzer 30 includes an acquirer 31, a memory 32 (or storage), a determiner 33, a measurer (measuring unit) 34, a distance calculator 35, and an image generator 36. The acquirer 31 acquires color information (such as color information 205, 204, 405 in FIGS. 2 to 4) on at least one of ultraviolet light and infrared light, and visible light, from image data. The color information is acquired for each pixel in the image sensor 22. The memory 32 stores the reference data on the color information. The determiner 33 determines the characteristic data (such as characteristic values 200, 300, and 400 in FIGS. 2 to 4) of the object 60 contained in the image data based on the color information, the reference data, and the image capturing condition information. The characteristic data is displayed on the display unit 40, and stored in the EEPROM 50. As described above, the characteristic data changes in accordance with the image capturing condition information, even when the color information is common. Thus, the characteristic data can be accurately determined by further utilizing the image capturing condition information.

The image capturing condition information may contain information on the image capturer 20 (image capturing unit). The information on the image capturer 20 contains information on a characteristic of the image sensor 22 (such as spectral sensitivity curves 214, 314, 414 in FIGS. 2 to 4). The information on the image capturer 20 contains information on a characteristic of the image capturing optical system 21 (such as the spectral transmittances 213, 313, and 413 in FIGS. 2 to 4). The characteristic of the image capturing optical system 21 may contain information, for example, on an angle of view of the image capturing optical system 21. The image capturing condition information may contain information on the image capturing environment. The information on the image capturing environment may contain information on an illumination in image capturing. The measurer 34 measures or obtains a spectral characteristic of the illumination (such as the spectral distributions of the illumination lights 211, 311, and 411 in FIGS. 2 to 4). The information on the illumination may contain information on the spectral characteristic of the illumination. The distance calculator 35 calculates the object distance (distance from the image capturer 20 to the object 60). The information on the image capturing environment contains information on the object distance. The light significantly attenuates in accordance with the object distance due to the influence of fog in the air, etc. For example, as the object distance increases, the infrared light (near infrared light) increases. In this case, an electronic correction may be performed so as to reduce the color information on the infrared light (near infrared light) as the object distance increases.

The color information may be information on luminance information (a luminance value for each color) of the visible light and at least one of the ultraviolet light and the infrared light (near infrared light). The color information for the visible light contains color information of three colors of R, G, and B. The reference data may be data on a predetermined dictionary or a multivariance analysis equation.

The determiner 33 corrects the color information based on the image capturing condition information, and determines the characteristic data using the corrected color information and the reference data stored in the memory 32. The determiner 33 corrects the reference data stored in the memory 32 based on the image capturing condition information, and calculates the characteristic data by using the color information and the corrected reference data. The memory 32 stores the reference data and the image capturing condition information by tagging them with each other, and the determiner 33 determines the characteristic data by using the reference data stored in the memory 32, the image capturing condition information, and a change amount (difference) of the image capturing condition information.

The image data may be obtained by performing the noise reduction processing that is different according to wavelengths of the visible light and at least one of the ultraviolet light and the infrared light. The image generator 36 generates a viewable image based on the color information. The generated viewable image may be displayed on the display unit 40 or an external display unit (not illustrated).

This embodiment may provide at least a partial function of the analyzer 30 to another information processing apparatus, such as a personal computer, separate from the image capturing apparatus 10. For example, the information processing apparatus (analyzer) obtains image data including the color information and the image capturing condition information from the image capturing apparatus, and the determiner in the information processing apparatus determines the characteristic data based on data. The characteristic data is displayed, for example, on the display unit in the information processing apparatus. Only part of function of the determiner 33 (processing for determining characteristic data) may be executed by a personal computer. At this time, the determiner 33 in the image capturing apparatus 10 determines information on the characteristic data on the object (such as a parameter used to determine the characteristic data) contained in the image data based on the color information, the reference data, and the image capturing condition information. The personal computer may obtain image data that includes the parameter from the image capturing apparatus, and the analyzer (determiner) in the personal computer may determine the characteristic data by using the parameter. The information on the characteristic data may be the characteristic data itself.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-050617, filed on Mar. 15, 2017, which is hereby incorporated by reference herein in its entirety.

What is claimed is:

1. An analyzer comprising:
one or more processors configured to:
acquire first color information on visible light and at least one of ultraviolet light and infrared light from first image data, the first image data being obtained by first image capturing using a first image sensor and a first image capturing optical system;
acquire second color information on visible light and at least one of ultraviolet light and infrared light from second image data, the second image data being obtained by second image capturing using a second image sensor and a second image capturing optical system;
determine first characteristic data relating to material information of an object contained in the first image data based on the first color information, first image capturing condition information, and reference data in which the color information of the object is tagged with the material information; and
determine second characteristic data relating to material information of the object contained in the second image data based on the second color information, second image capturing condition information, and the reference data,
wherein the first image capturing condition information contains information on a spectral characteristic of illumination light in the first image capturing, information on a spectral sensitivity curve of the first image sensor, and information on a spectral transmittance of the first image capturing optical system, and
wherein the second image capturing condition information contains information on a spectral characteristic of illumination light in the second image capturing, information on a spectral sensitivity curve of the second image sensor, and information on a spectral transmittance of the second image capturing optical system.

2. The analyzer according to claim 1, the one or more processors is configured to measure the spectral characteristic of the illumination light.

3. The analyzer according to claim 1, the one or more processors is configured to calculate an object distance,
wherein the first and second image capturing condition information contains information on the object distance.

4. The analyzer according to claim 1, wherein the color information is luminance information on the visible light and the at least one of ultraviolet light and infrared light.

5. The analyzer according to claim 1, wherein the color information contains color information on three colors of R, G, and B as the color information on the visible light.

6. The analyzer according to claim 1, wherein the reference data is data on a predetermined dictionary or a multivariate analysis equation.

7. The analyzer according to claim 1, wherein the one or more processors is configured to correct the first and second color information based on the first and second image capturing condition information, and determine the first and second characteristic data based on the corrected first and second color information and the reference data.

8. The analyzer according to claim 1, wherein the one or more processors is configured to correct the reference data based on the first and second image capturing condition information, and calculate the first and second characteristic data based on the first and second color information and the corrected reference data.

9. The analyzer according to claim 1, wherein the first and second characteristic data are different each other when the first and second color information is common.

10. The analyzer according to claim 1,
wherein the one or more processors is configured to determine the first and second characteristic data by using the first and second image capturing condition information and the reference data tagged with each other, and a change amount of the first and second image capturing condition information.

11. The analyzer according to claim 1, wherein the first and second image data is obtained through noise reduction processing that is different according to wavelengths of the visible light and the at least one of ultraviolet light and infrared light.

12. The analyzer according to claim 1, further comprising an image generator configured to generate a viewable image based on the first and second color information.

13. An image capturing apparatus comprising:
the analyzer according to claim 1; and
an image capturer including the first image sensor and the first image capturing optical system, configured to output the first image data.

14. The image capturing apparatus according to claim 13, wherein the information on the first characteristic data contains a parameter used to determine the first characteristic data.

15. An analyzing method comprising the steps of:
acquiring first color information on visible light and at least one of ultraviolet light and infrared light from first image data, the first image data being obtained by first image capturing using a first image sensor and a first image capturing optical system;
acquiring second color information on visible light and at least one of ultraviolet light and infrared light from second image data, the second image data being obtained by second image capturing using a second image sensor and a second image capturing optical system;
determining first characteristic data relating to material information of an object contained in the first image data based on the first color information, first image capturing condition information, and reference data in which the color information of the object is tagged with the material information; and
determining second characteristic data relating to material information of the object contained in the second image data based on the second color information, second image capturing condition information, and the reference data,
wherein the first image capturing condition information contains information on a spectral characteristic of illumination light in the first image capturing, information on a spectral sensitivity curve of the first image sensor, and information on a spectral transmittance of the first image capturing optical system, and
wherein the second image capturing condition information contains information on a spectral characteristic of illumination light in the second image capturing, information on a spectral sensitivity curve of the second image sensor, and information on a spectral transmittance of the second image capturing optical system.

16. A non-transitory computer-readable storage medium storing a program that enables a computer to execute the analyzing method according to claim 15.

* * * * *